(12) United States Patent
Yamamoto et al.

(10) Patent No.: US 10,851,804 B2
(45) Date of Patent: Dec. 1, 2020

(54) ACCUMULATOR

(71) Applicants: ADVICS CO., LTD., Kariya (JP);
NHK SPRING CO., LTD., Yokohama (JP)

(72) Inventors: Hideki Yamamoto, Handa (JP);
Hiroshi Mizukami, Kanagawa (JP)

(73) Assignee: NHK SPRING CO., LTD., Yokohama (JP)

( * ) Notice: Subject to any disclaimer, the term of this patent is extended or adjusted under 35 U.S.C. 154(b) by 68 days.

(21) Appl. No.: 15/753,916

(22) PCT Filed: Jul. 19, 2016

(86) PCT No.: PCT/JP2016/071187
§ 371 (c)(1),
(2) Date: Feb. 20, 2018

(87) PCT Pub. No.: WO2017/033624
PCT Pub. Date: Mar. 2, 2017

(65) Prior Publication Data
US 2018/0245606 A1    Aug. 30, 2018

(30) Foreign Application Priority Data
Aug. 21, 2015    (JP) ................... 2015-164222

(51) Int. Cl.
| F15B 1/10 | (2006.01) |
| F15B 1/08 | (2006.01) |
| F16L 55/053 | (2006.01) |

(52) U.S. Cl.
CPC .............. *F15B 1/103* (2013.01); *F15B 1/083* (2013.01); *F15B 1/106* (2013.01); *F16L 55/053* (2013.01);

(Continued)

(58) Field of Classification Search
CPC .. F15B 1/103; F15B 1/106; F15B 2201/4056; F15B 2201/605
See application file for complete search history.

(56) References Cited

U.S. PATENT DOCUMENTS

| 3,674,054 A | 7/1972 | Mercier | |
| 2006/0037658 A1* | 2/2006 | Shimbori | F15B 1/106 138/30 |
| 2010/0108168 A1* | 5/2010 | Ota | F15B 1/103 138/30 |

FOREIGN PATENT DOCUMENTS

| GB | 2464088 A | * | 4/2010 | ............ B23K 33/00 |
| JP | 50-6248 B1 | | 3/1975 | |

(Continued)

OTHER PUBLICATIONS

Machine Translation of JP2005351297A (Year: 2005).*

(Continued)

*Primary Examiner* — Christopher M Koehler
*Assistant Examiner* — Kyle A Cook
(74) *Attorney, Agent, or Firm* — Buchanan Ingersoll & Rooney PC (57) ABSTRACT

An accumulator according to an embodiment includes, for example, a base member; a cover member welded to the base member, the cover member and the base member defining a pressure chamber therebetween; a stretchable partition member that partitions the pressure chamber into an inner chamber and an outer chamber; and a labyrinth structure provided in at least one of a first part of the base member and a second part of the cover member. The first part is located closer to the outer chamber than a welded part between the base member and the cover member. The second part is located closer to the outer chamber than the welded part, facing the first part.

8 Claims, 7 Drawing Sheets

(52) U.S. Cl.
CPC ............. *F15B 2201/3153* (2013.01); *F15B 2201/4056* (2013.01); *F15B 2201/605* (2013.01)

(56) References Cited

FOREIGN PATENT DOCUMENTS

| JP | 55-47241 B2 | 11/1980 | | |
|---|---|---|---|---|
| JP | 2005-351297 A | 12/2005 | | |
| JP | 2008291974 A | * 12/2008 | ............. | F15B 1/103 |

OTHER PUBLICATIONS

Machine Translation of JP2008-291974A (Year: 2008).*
International Search Report (PCT/ISA/210) dated Oct. 18, 2016, by the Japanese Patent Office as the International Searching Authority for International Application No. PCT/JP2016/071187.
Written Opinion (PCT/ISA/237) dated Oct. 18, 2016, by the Japanese Patent Office as the International Searching Authority for International Application No. PCT/JP2016/071187.

* cited by examiner

ACCUMULATOR

CROSS-REFERENCE TO RELATED APPLICATIONS

This application is national stage application of International Application No. PCT/JP2016/071187, filed Jul. 19, 2016, which designates the United States, incorporated herein by reference, and which is based upon and claims the benefit of priority from Japanese Patent Application No. 2015-164222, filed Aug. 21, 2015, the entire contents of which are incorporated herein by reference.

TECHNICAL FIELD

This disclosure generally relates to an accumulator.

BACKGROUND ART

Conventionally, accumulators including a pressure chamber defined by two members joined by full-circled welding are known (see Patent Literature 1). Patent Literature 1 describes a welded part covered by a ring in order to prevent entry of sputter into the pressure chamber during welding.

CITATION LIST

Patent Literature

Patent Literature 1: Japanese Patent Application Laid-open No. 2005-351297

SUMMARY OF INVENTION

Problem to be Solved by the Invention

By inclusion of the ring, the above conventional accumulator increases in the number of parts, for example.

It is thus a problem to be solved of the present invention to attain an accumulator that can be less affected by sputter without using a separate member, for example.

Means for Solving Problem

An accumulator according to an embodiment of the present invention includes, for example, a base member; a cover member that is welded to the base member, the cover member and the base member defining a pressure chamber therebetween; a partition member that is stretchable and partitions the pressure chamber into an inner chamber and an outer chamber; and a labyrinth structure provided in at least one of a first part of the base member and a second part of the cover member, the first part being located closer to the outer chamber than a welded part between the base member and the cover member, the second part being located closer to the outer chamber than the welded part, the second part facing the first part.

The accumulator includes the labyrinth structure in at least one of the first part and the second part located on the outer chamber side of the welded part. According to the accumulator, for example, it is possible to prevent sputter occurring from welding of the welded part from moving toward the outer chamber and affecting the partition member or causing dust in the outer chamber.

In the accumulator, the labyrinth structure is provided between the welded part and the partition member. According to the accumulator, for example, it is possible to prevent the sputter occurring from welding of the welded part from affecting the partition member.

In the accumulator, the labyrinth structure includes a wall provided in one of the first part and the second part, the wall that projects towards the other of the first part and the second part. According to the accumulator, for example, the labyrinth structure having a relatively simple structure is attainable.

In the accumulator, the wall contacts with the other of the first part and the second part. According to the accumulator, for example, since the gap between the first part and the second part is narrowed, it is possible to more certainly prevent the sputter occurring from welding of the welded part and the dust caused by the sputter from moving toward the outer chamber.

In the accumulator, a radial thickness of the wall decreases toward the other of the first part and the second part. According to the accumulator, by an increased contact pressure between the first part and the second part, the gap between the first part and the second part can be easily occluded. Thus, for example, the sputter occurring from welding of the welded part and the dust caused by the sputter can be more certainly prevented from moving toward the outer chamber.

In the accumulator, the labyrinth structure covers the welded part. According to the accumulator, for example, it is possible to prevent sputter occurring from welding of the welded part from moving toward the outer chamber and affecting the partition member or causing dust in the outer chamber in the outer chamber.

DESCRIPTION OF EMBODIMENTS

Hereinafter, exemplary embodiments of the present invention are disclosed. Constitutions of the embodiments illustrated below and operation and results (effects) derived from the constitutions are merely exemplary. The present invention can also be achieved by a constitution other than the constitutions disclosed in the following embodiments. Furthermore, the present invention can achieve at least one of various advantageous effects (also including derivative effects) attained by the constitutions.

The following embodiments and modifications include same or like constitutional elements. Hereinafter, the same or like constitutional elements are given the same numerals codes, and their repeated explanations may be omitted. In the present description, ordinal numbers are assigned to differentiate components or parts for the sake of convenience and are not intended to indicate priority or order.

First Embodiment

Figure 1:
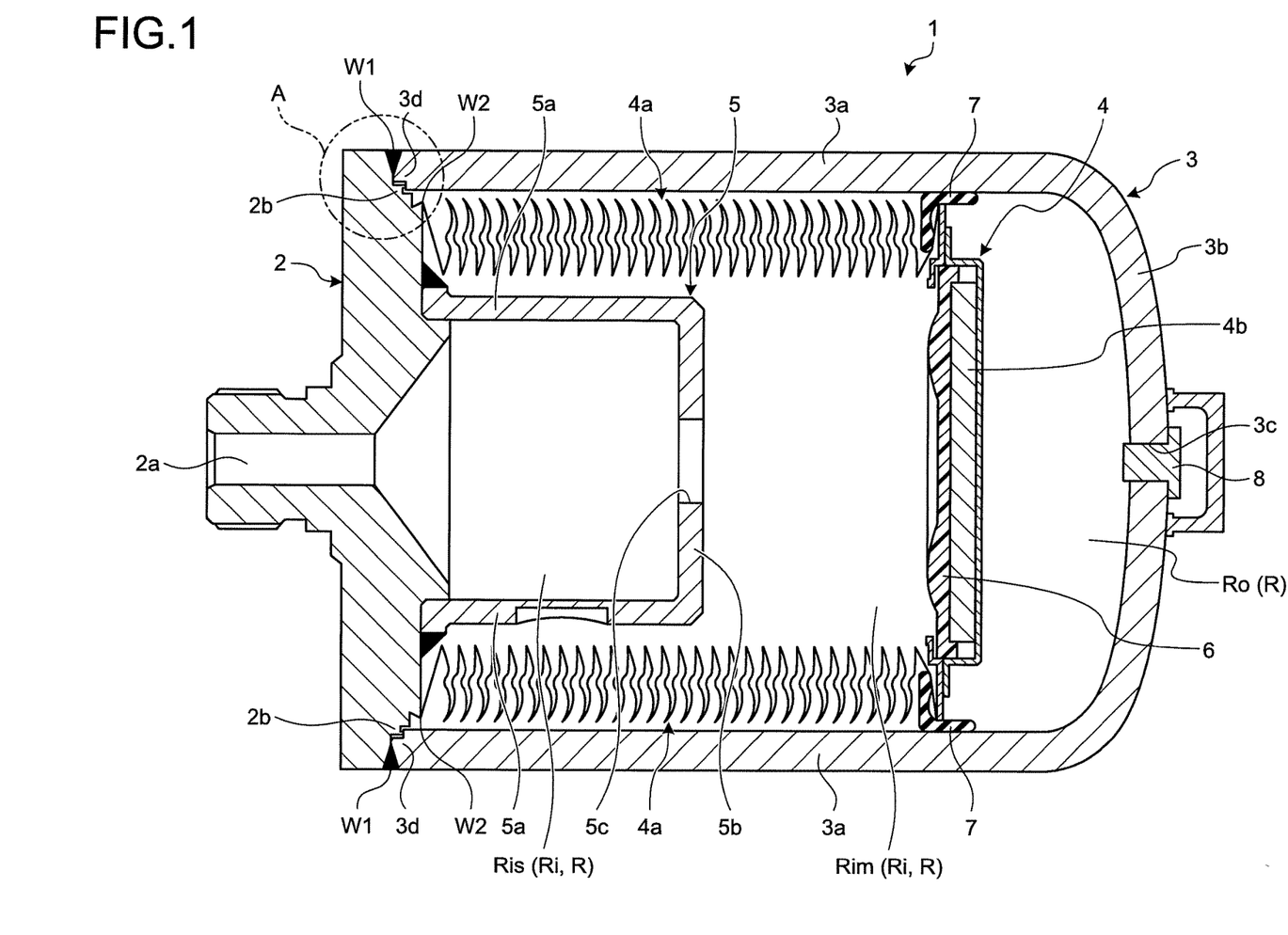
FIG. 1 is an exemplary and schematic sectional view of an accumulator according to a first embodiment.

FIG. 1 is a sectional view of an accumulator 1. The accumulator 1 includes a base member 2 and a cover member 3. The cover member 3 has a cylindrical shape having one open end and the other closed end. That is, the cover member 3 includes a tubular part 3a and a bottom wall 3b. The base member 2 has a disc-like shape, and covers one end, that is, the open end of the cover member 3. The outer peripheries of the base member 2 and the cover member 3 are joined to each other by full-circled welding. The base member 2 and the cover member 3 are joined to each other by electron beam welding or resistance welding, for example, however, welding type and method are not limited to these examples. Each of the base member 2 and the cover member 3 is formed of a metallic material such as stainless steel, however, the material thereof is not limited thereto. The base member 2 may also be referred to as a lid member. The cover member 3 may also be referred to as a shell. The tubular part 3a may also be referred to as a peripheral wall or a side wall. The bottom wall 3b may also be referred to as an end wall.

The base member 2 and the cover member 3 define a pressure chamber R. The pressure chamber R accommodates a partition member 4 joined to the inner surface of the base member 2. The partition member 4 has a cylindrical shape having one open end and the other closed end. That is, the partition member 4 includes a tubular part 4a and a bottom wall 4b. The base member 2 covers one end, that is, the open end of the partition member 4. The outer peripheries of the base member 2 and the partition member 4 are joined to each other by full-circled welding. The partition member 4 is housed in the pressure chamber R, partitioning the pressure chamber R into an inner chamber Ri and an outer chamber Ro.

The tubular part 4a is an axially stretchable metallic bellows. The bottom wall 4b has a disc-like shape. The outer peripheries of the tubular part 4a and the bottom wall 4b are joined to each other by full-circled welding. Each of the tubular part 4a and the bottom wall 4b is formed of a metallic material such as stainless steel, however, the material thereof is not limited to a metallic material. The tubular part 4a may also be referred to as an elastic part. The bottom wall 4b may also be referred to as an end wall.

An auxiliary tube 5 is joined to the pressure chamber-R side of the base member 2 inside the inner chamber Ri. The auxiliary tube 5 has a cylindrical shape having one open end and the other closed end. That is, the auxiliary tube 5 has a tubular part 5a and a bottom wall 5b. The base member 2 covers one end, that is, the open end of the auxiliary tube 5. The outer peripheries of the base member 2 and the auxiliary tube 5 are joined to each other by full-circled welding. The tubular part 5a may be referred to as a peripheral wall or a side wall. The bottom wall 5b may also be referred to as an end wall. The auxiliary tube 5 is formed of a metallic material such as stainless steel, for example, however, the material thereof is not limited to this example.

The auxiliary tube 5 partitions the inner chamber Ri into a main chamber Rim and an auxiliary chamber Ris. The bottom wall 5b is provided with a communicating hole 5c that connects the main chamber Rim and the auxiliary chamber Ris.

The accumulator 1 according to the present embodiment is of so-called an external gas accumulation. That is, the outer chamber Ro stores a gas therein, and the inner chamber Ri (main chamber Rim and auxiliary chamber Ris) stores a liquid therein. The inner chamber Ri can store a liquid while the tubular part 4a of the partition member 4 is being stretched. The outer chamber Ro can also store a liquid for adjusting the volume of the gas.

The base member 2 is provided with a liquid passage 2a which faces the auxiliary chamber Ris. The liquid flows through the liquid passage 2a between the auxiliary chamber Ris and the outside of the accumulator 1. The liquid also flows through the communicating hole 5c between the auxiliary chamber Ris and the main chamber Rim.

A sealing member 6 is attached to the communicating hole-5c side of the bottom wall 4b of the partition member 4. In the most shrunk state of the partition member 4, the sealing member 6 closes the communicating hole 5c from the main chamber-Rim side. The partition member 4 is shrinkable to the position where the sealing member 6 contacts with the auxiliary tube 5. That is, in the present embodiment, the auxiliary tube 5 sets a shrink range of the partition member 4, and prevents the partition member 4 from excessively shrinking. Furthermore, the sealing member 6 can buffer impact from the direct contact between the bottom wall 4b of the partition member 4 and the bottom wall 5b of the auxiliary tube 5. That is, the sealing member 6 is also one example of a buffer member. The sealing member 6 can be made from an elastic material, such as a synthetic resin material or an elastomer.

A short annular cylindrical guide member 7 is attached to the outer chamber-Ro side of the bottom wall 4b of the partition member 4. The guide member 7 slides along the inner surface of the tubular part 3a of the cover member 3 together with the stretching/shrinking of the partition member 4. The guide member 7 guides the partition member 4 to prevent the partition member 4 from inclining, bending, or vibrating. Thus, the guide member 7 may also be referred to as a damping member. Furthermore, the guide member 7 prevents the direct contact between the partition member 4 and the inner peripheral face of the cover member 3. Thus, the guide member 7 may also be referred to as an anti-wear member. The guide member 7 can be made of a synthetic resin material, for example.

The guide member 7 is provided with a passage (not illustrated in the drawings), such as a recess or a gap, in the outer edge. The gas and the gas-volume adjusting liquid stored in the outer chamber Ro can flow back and forth through the passage between both sides of the guide member 7 in the outer chamber Ro, that is, between the outer peripheral area of the tubular part 4a and the axially outer area of the bottom wall 4b in the outer chamber Ro.

The gas is enclosed in the outer chamber Ro. The cover member 3 is provided with a gas inlet 3c in the bottom wall 3b. The outer chamber Ro is filled with the gas supplied from outside through the gas inlet 3c and thereafter, the gas inlet 3c is closed by a plug 8.

The liquid passage 2a is connected to, for example, a hydraulic circuit of a braking device. In stretched state of the partition member 4, the liquid is introduced and stored into the inner chamber Ri from the hydraulic circuit. In shrunk state of the partition member 4, the liquid is returned from the inner chamber Ri to the hydraulic circuit.

Figure 2:
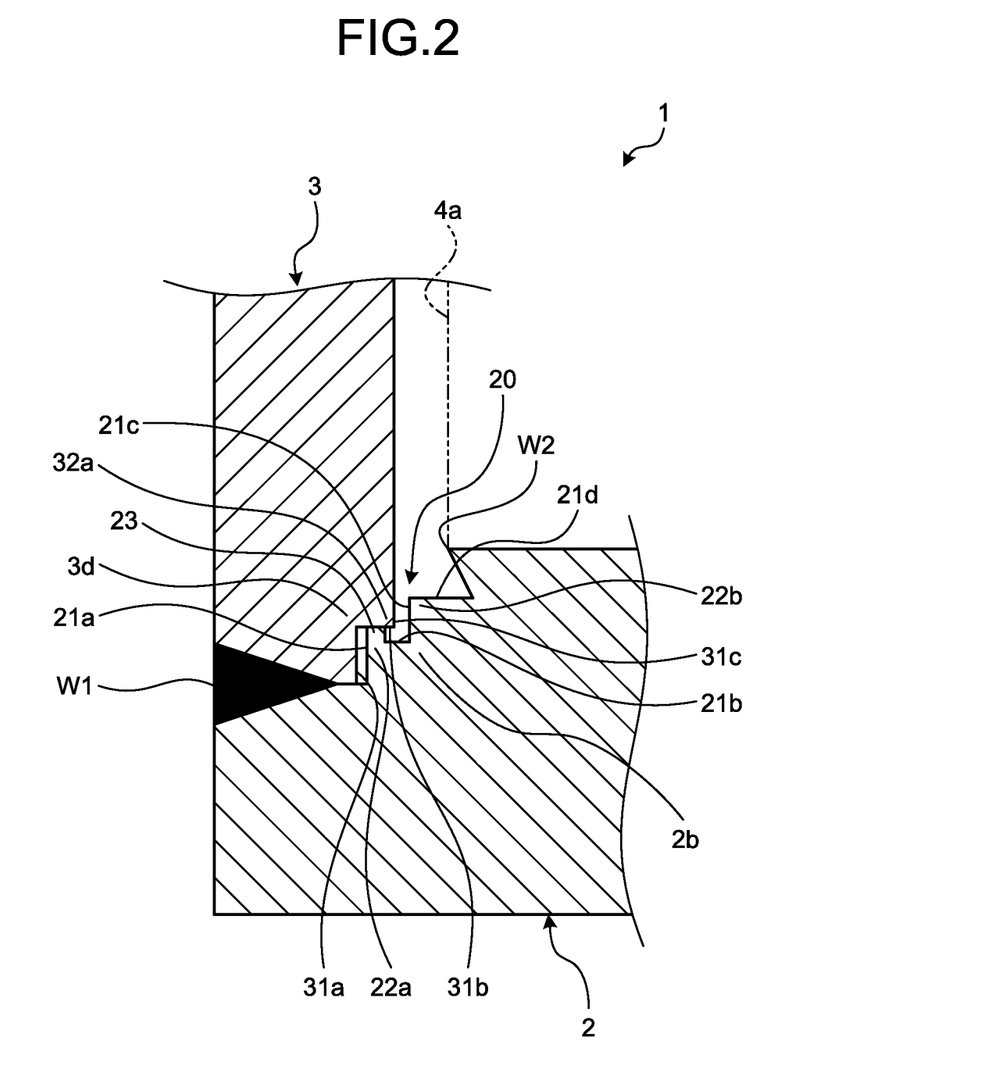
FIG. 2 is an enlarged view of a part A in FIG. 1.

FIG. 2 is an enlarged view of a part A in FIG. 1. As illustrated in FIG. 2, in the present embodiment a labyrinth structure 20 is disposed on the outer chamber-Ro side of a first welded part W1 between the base member 2 and the cover member 3 so as to cover the first welded part W1. That is, the labyrinth structure 20 is disposed between the first welded part W1 and the tubular part 4a of the partition member 4, or between the first welded part W1 and a second welded part W2 between the base member 2 and the partition member 4. The first welded part W1 is one example of a welded part.

The labyrinth structure 20 in the present embodiment is provided to each of a first part 2b of the base member 2 and a second part 3d of the cover member 3. The first part 2b is a part of the outer peripheral end of the base member 2 and is closer to the outer chamber Ro than the first welded part W1. The second part 3d is a part of the open end of the tubular part 3a of the cover member 3 and is closer to the outer chamber Ro than the first welded part W1. The first part 2b and the second part 3d face each other with a gap in the peripheral edge of the outer chamber Ro. The labyrinth structure 20 can prevent sputter occurring from welding of the first welded part W1 from moving toward the outer chamber Ro, thereby preventing the sputter from adhering to the tubular part 4a of the partition member 4 or causing dust in the outer chamber Ro.

To be more specific, the first part 2b is stepwise, and has a first peripheral face 21a, a first annular face 21b, a second peripheral face 21c, and a second annular face 21d in order from the first welded part-W1 side. The first peripheral face 21a and the first annular face 21b define a first annular corner 22a. The second peripheral face 21c and the second annular face 21d define a second annular corner 22b. The first corner 22a and the second corner 22b are one example of a wall of the first part 2b, the wall projecting toward the second part 3d. The first corner 22a and the second corner 22b may also be referred to as projections.

The second part 3d is also stepwise, and has a first inner peripheral face 31a, a third annular face 31b, and a second inner peripheral face 31c in order from the first welded part W1 side. The third annular face 31b and the second inner peripheral face 31c define a third annular corner 32a. The third corner 32a is one example of a wall of the second part 3d, the wall projecting towards the first part 2b. The third corner 32a may also be referred to as a projection.

The third corner 32a enters a recess (corner) between the first corner 22a and the second corner 22b. That is, the first corner 22a, the third corner 32a, and the second corner 22b are alternately arranged to fit in with each other with a gap, covering the first welded part W1. Thus, in the present embodiment, mutually overlapping corners of the labyrinth structure 20, that is, the first corner 22a, the third corner 32a, and the second corner 22b form a gap that extends in bent form as away from the first welded part W1. The first corner 22a, the second corner 22b, and the third corner 32a can independently serve as the labyrinth structure 20 and prevent the movement of the sputter.

In the present embodiment, the first part 2b includes, in the first corner 22a, an annular projection 23 that projects from the first annular face 21b. The distal end of the projection 23 contacts with the third annular face 31b of the second part 3d. This narrows the gap between the first part 2b and the second part 3d, thereby more certainly preventing the sputter occurring from welding of the first welded part W1 and the dust caused by the sputter from moving toward the outer chamber Ro. The distal end of the projection 23 may be elastically or plastically deformed at the time of joining the base member 2 and the cover member 3 to each other. The periphery of the projection 23 does not entirely contact with the second part 3d, and is separated with a gap from the second part 3d at least one or two or more locations, for example. That is, in the outer chamber Ro, a part on the first welded part-W1 side of the projection 23 is communicated with a part on the opposite side. This can prevent the formation of a closed space on the first welded part-W1 side of the projection 23 and prevent the closed space from excessively rising in pressure when heated at the time of welding of the first welded part W1. The projection 23 is one example of a wall.

As explained heretofore, according to the present embodiment, the first part 2b and the second part 3d, which are located on the outer chamber-Ro side, i.e., pressure chamber-R side of the first welded part W1, includes the labyrinth structure 20. Thereby, the present embodiment can prevent, for example, the sputter occurring from welding of the first welded part W1 from moving toward the outer chamber Ro and affecting the partition member 4, e.g., adhering to the tubular part 4a, or causing dust in the outer chamber Ro.

In the present embodiment, the labyrinth structure 20 is provided between the first welded part W1 and the tubular part 4a (metallic bellows) of the partition member 4. According to the present embodiment, thus, the sputter caused by the welding of the first welded part W1 can be more certainly prevented from affecting the partition member 4, for example.

In the present embodiment, the labyrinth structure 20 further has the first corner 22a, the third corner 32a, and the second corner 22b (wall). According to the present embodiment, the labyrinth structure 20 with a relatively simple structure is thus attainable.

In the present embodiment, the projection 23 projecting from the first corner 22a of the first part 2b contacts with the second part 3d. Due to the narrowed gap between the first part 2b and the second part 3d, the present embodiment can more certainly prevent the sputter occurring from welding of the first welded part W1 and the dust caused by the sputter from moving toward the outer chamber Ro, for example.

In the present embodiment, the labyrinth structure 20 is provided to cover the first welded part W1. According to the present embodiment, the sputter caused by welding of the first welded part W1 can be more certainly prevented from moving toward the outer chamber Ro, for example.

First Modification

Figure 3:
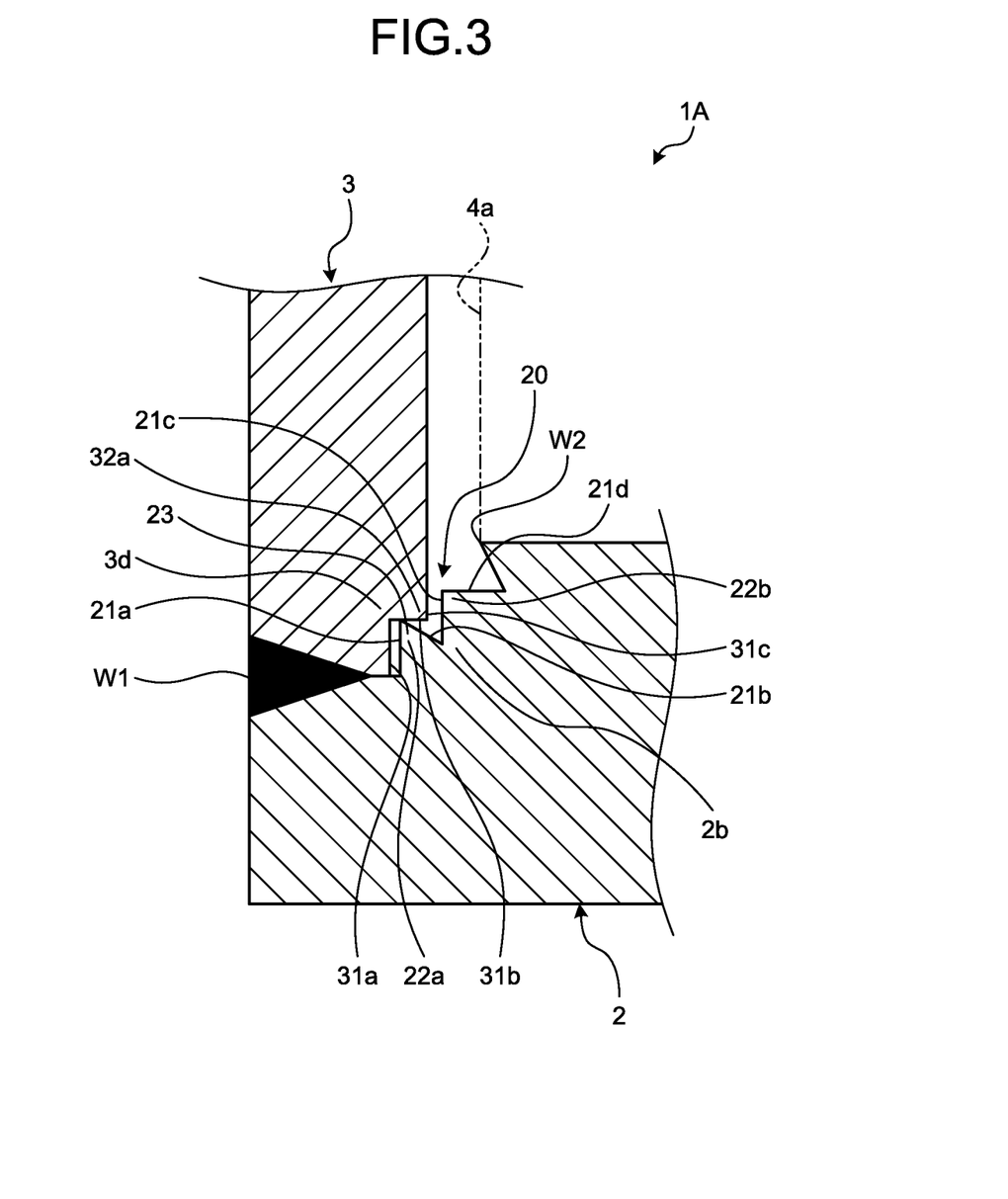
FIG. 3 is an enlarged view of a part of an accumulator according to a first modification of the first embodiment, at a position equivalent to the position of the part A in FIG. 1.

An accumulator 1A of the present modification illustrated in FIG. 3 also has the same structure as that of the accumulator 1 of the above-mentioned embodiment. Thus, the present modification can also attain the same effects (results) based on the same structure. However, the present modification differs in that the first annular face 21b has a conical concave shape, and the first corner 22a projects towards the third annular face 31b as a whole. The distal end of the first corner 22a serves as the projection 23 which contacts with the third annular face 31b. According to the present modification, for example, it is possible to form the projection 23 having a relatively simple structure. The projection 23 is also sharp in form which decreases in radial thickness toward the second part 3d, and exerts higher contact pressure than the projection 23 of not sharp form. Because of this, the distal end of the projection 23 or the third annular face 31b is easily deformable. That is, the gap between the first part 2b and the second part 3d can be easily occluded. This can lead to more certainly preventing the sputter occurring from welding of the first welded part W1 and the dust caused by the sputter from moving toward the outer chamber Ro, for example.

Second Modification

Figure 4:
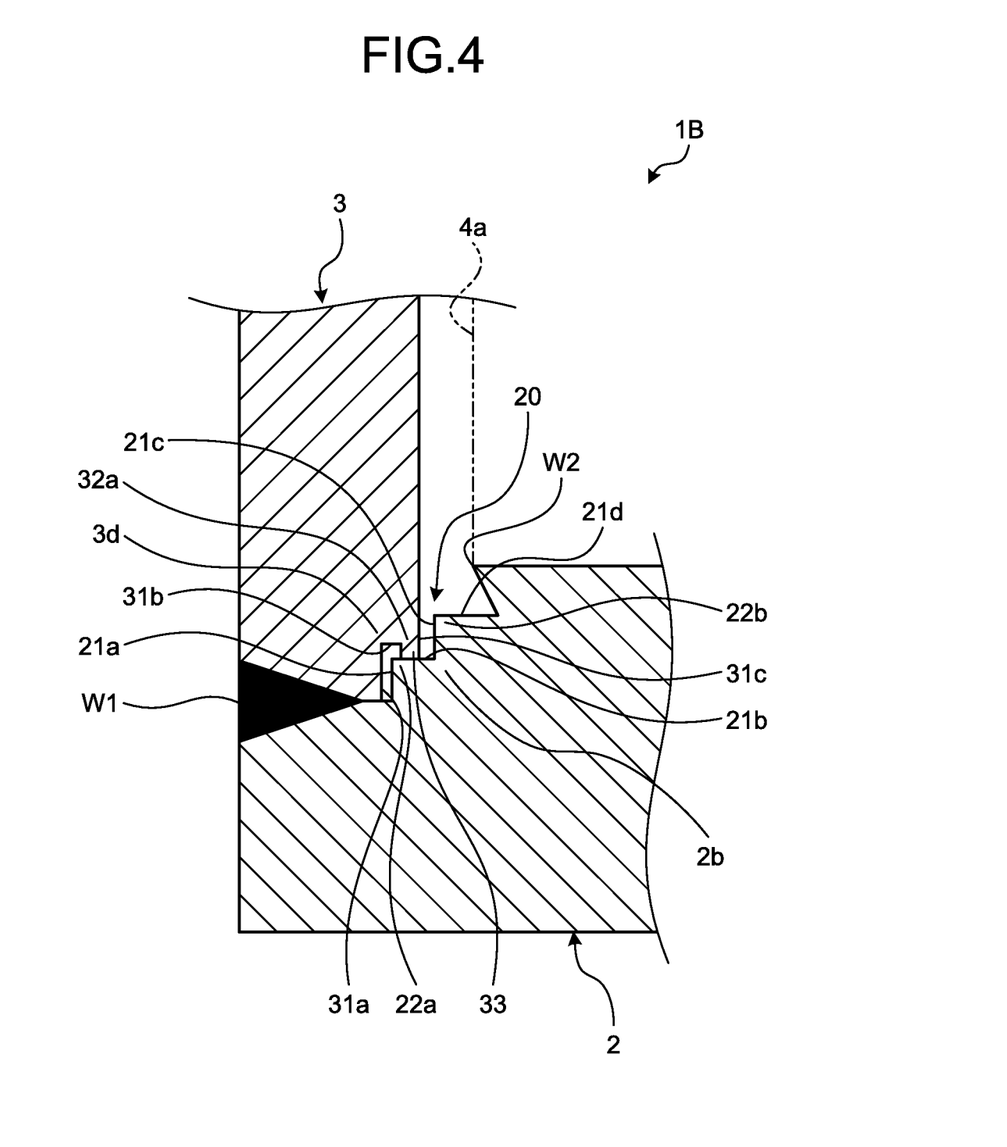
FIG. 4 is an enlarged view of a part of an accumulator according to a second modification of the first embodiment, at a position equivalent to the position of the part A in FIG. 1.

An accumulator 1B of the present modification illustrated in FIG. 4 also has the same structure as that of the accumulator 1 of the above-mentioned embodiment. The present modification can also attain the same effects (results) based on the same structure. However, the present modification differs in that a projection 33 projects from the third annular face 31b of the second part 3d and contacts with the first annular face 21b of the first part 2b. That is, the projection 33 may be provided in the second part 3d. The projection 33 is one example of a wall.

Third Modification

Figure 5:
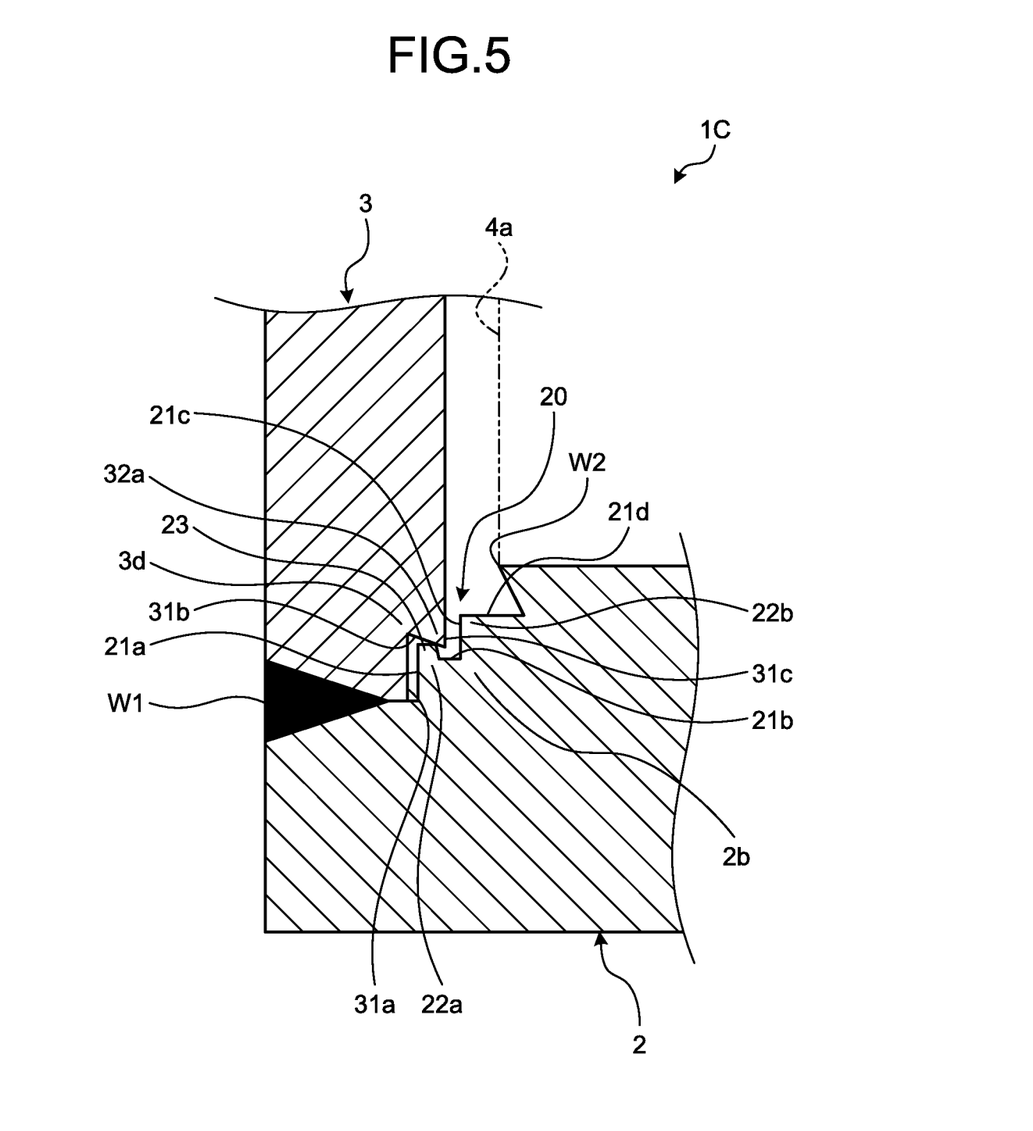
FIG. 5 is an enlarged view of a part of an accumulator according to a third modification of the first embodiment, at a position equivalent to the position of the part A in FIG. 1.

An accumulator 1C of the present modification illustrated in FIG. 5 also has the same structure as that of the accumulator 1 of the above-mentioned embodiment. The present modification can also attain the same effects (results) based on the same structure. However, the present modification differs in that the third annular face 31b of the second part 3d, which contacts the projection 23 of the first part 2b, has a conical convex shape. In this case, the contact pressure between the projection 23 and the third annular face 31b can further increase by the contact between the corner of the projection 23 and the third annular face 31b, making the distal end of the projection 23 or the third annular face 31b easily deformable. Thus, the gap between the first part 2b and the second part 3d can be easily occluded. According to the present modification, it is made more difficult, for example, for the sputter occurring from welding of the first welded part W1 and the dust caused by the sputter to pass the contact portion between the projection 23 and the third annular face 31b.

Fourth Modification

Figure 6:
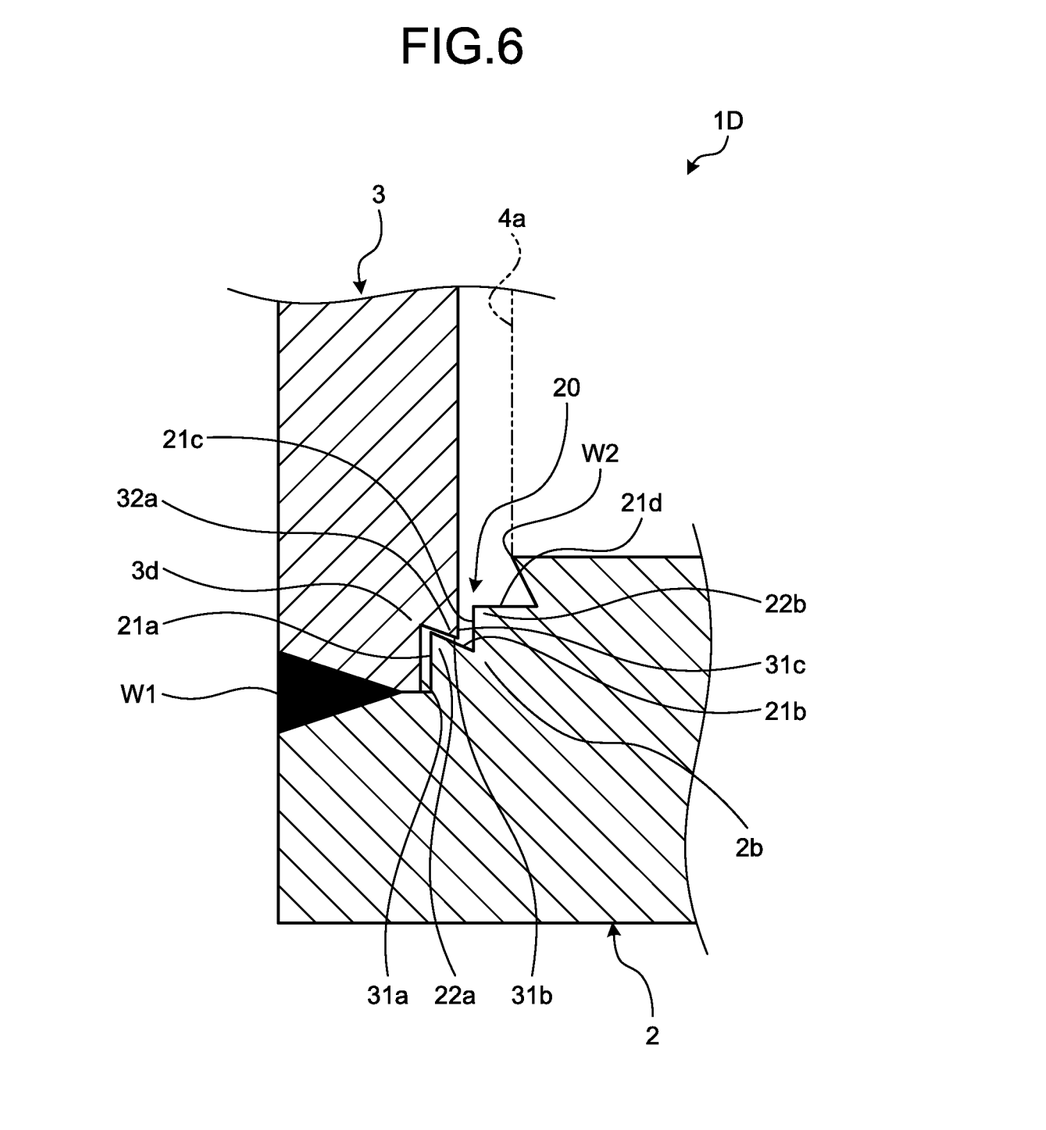
FIG. 6 is an enlarged view of a part of an accumulator according to a fourth modification of the first embodiment, at a position equivalent to the position of the part A in FIG. 1.

An accumulator 1D of the present modification illustrated in FIG. 6 also has the same structure as that of the accumulator 1 of the above-mentioned embodiment. Thus, the present modification can also attain the same effects (results) based on the same structure. However, the present modification differs in that the first annular face 21b has a conical concave shape, the third annular face 31b has a conical convex shape, and the first annular face 21b and the third annular face 31b face each other with a narrow gap. In such structure, setting a relatively narrow gap between the first annular face 21b and the third annular face 31b makes it difficult for the sputter occurring from welding of the first welded part W1 and the dust caused by the sputter to move toward the outer chamber Ro.

Second Embodiment

Figure 7:
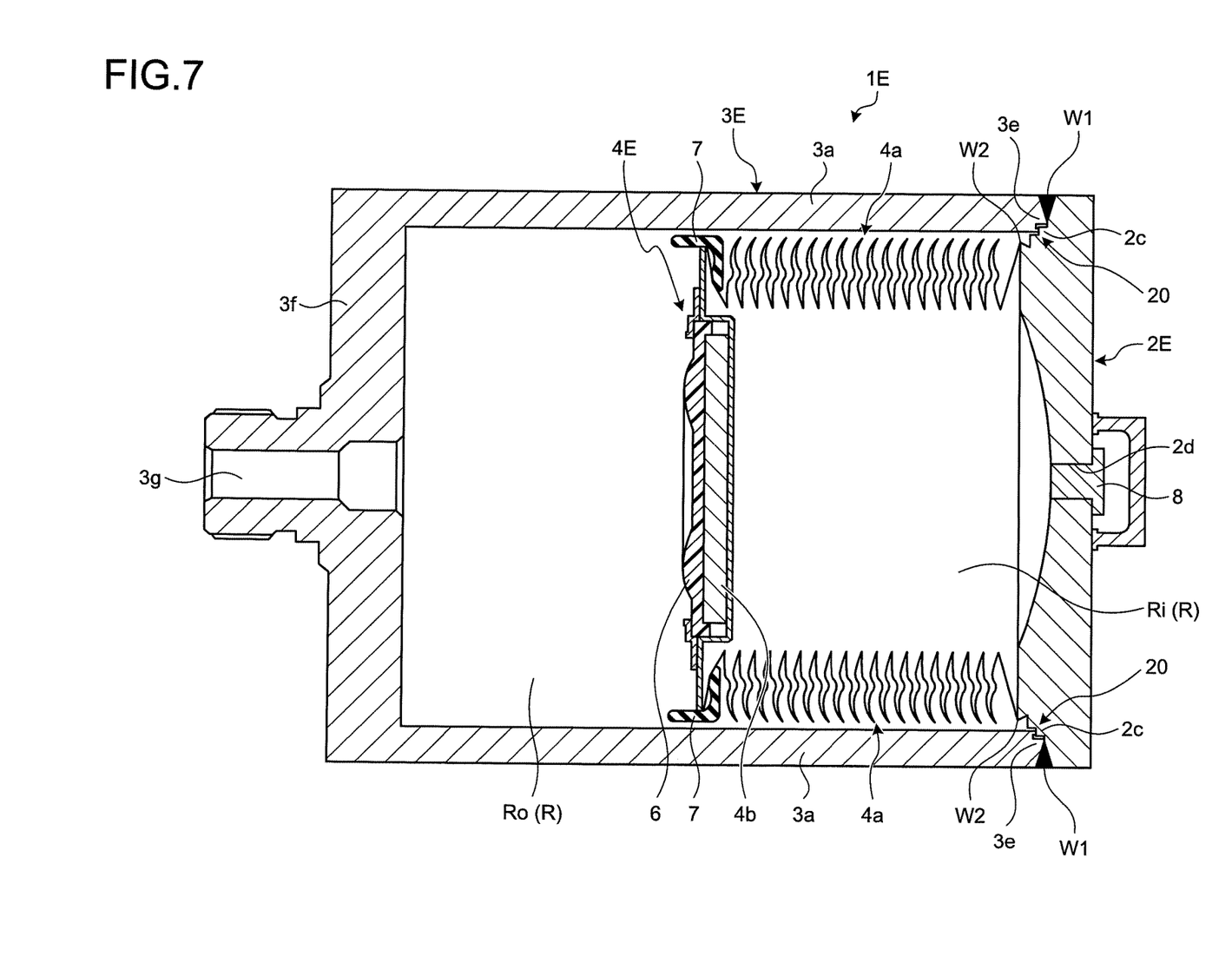
FIG. 7 is an exemplary and schematic sectional view of an accumulator according to a second embodiment.

An accumulator 1E of the present embodiment illustrated in FIG. 7 also has the same structure as those of the accumulators 1 to 1D in the first embodiment and the modifications. Thus, the present embodiment can also attain the same effects (results) based on the same structure. However, the accumulators 1 to 1D in the first embodiment and modifications illustrated in FIGS. 1 to 6 are of so-called external gas accumulation enclosing a gas outside a partition member 4E, that is, outside a tubular part 4a (metallic bellows), and having a liquid introduced into the inside of the partition member 4E. The accumulator 1E of the present embodiment is, however, of so-called an internal gas accumulation enclosing a gas inside the partition member 4E, that is, inside the tubular part 4a (metallic bellows), and having a liquid introduced into the outside of the partition member 4E.

A cover member 3E has a cylindrical shape having one closed end and the other open end. That is, the cover member 3E has a tubular part 3a and a bottom wall 3f. A base member 2E has a disc-like shape, and covers the open end, that is, the other end of the cover member 3E. The cover member 3E and the base member 2E are joined to each other at a first welded part W1 by full-circled welding. The cover member 3E is provided with a liquid passage 3g.

The partition member 4E defines, inside, an inner chamber Ri enclosing a gas and defines, outside, an outer chamber Ro into which a liquid is introduced. The partition member 4E is stretchable to the position where a sealing member 6 on the bottom wall-3f side of a bottom wall 4b contacts with the bottom wall 3f. In the most stretched state of the partition member 4E, the sealing member 6 occludes the liquid passage 3g. There is a gap provided between the outer periphery of the guide member 7 and the inner peripheral face of the tubular part 3a. Thus, the surroundings of the tubular part 4a of the partition member 4E are also a part of the outer chamber Ro.

The internal gas-accumulation accumulator 1E of the present embodiment may also include a labyrinth structure 20, for the first welded part W1, similar to those of the first embodiment and the modifications. The labyrinth structure 20 of the present embodiment is provided to each of a first part 2c of the base member 2E and a second part 3e of the cover member 3E. The first part 2c is a part of the outer peripheral end of the base member 2E and is closer to the outer chamber Ro than the first welded part W1. The second part 3e is a part of the axial end of the tubular part 3a of the cover member 3E and is closer to the outer chamber Ro than the first welded part W1. The first part 2c and the second part 3e face each other with a gap in the peripheral edge of the outer chamber Ro. In the present embodiment, the labyrinth structure 20 can prevent the sputter occurring from welding of the first welded part W1 from moving toward the outer chamber Ro and adhering to the tubular part 4a of the partition member 4E or causing dust in the outer chamber Ro.

The embodiments of the present invention have been illustrated as above, however, the aforementioned embodiments are merely exemplary and not intended to limit the scope of the invention. The above embodiments may be implemented in other various modes. Without departing from the spirit of the invention, various omissions, replacements, combinations, and changes may be made. Specifications (structure, kind, number, size, position, arrangement, and the like) of each element, mechanism, and form may be appropriately modified for implementation. The above-mentioned embodiments and modifications can be partially interchanged structurally. For example, it is not necessary to provide the partition member on the base member to be welded to the cover member. The accumulators can be applied to devices in various fields.

EXPLANATIONS OF LETTERS OR NUMERALS 1, 1A to 1E Accumulator
2, 2E Base member
2b, 2c First part
3, 3E Cover member
3d, 3e Second part
4, 4E Partition member
20 Labyrinth structure 22a First corner (wall)
22b Second corner (wall)
23 Projection (wall)
32a Third corner (wall)
33 Projection (wall)
R Pressure chamber
Ri Inner chamber
Ro Outer chamber
W1 First welded part (welded part)

The invention claimed is:

1. An accumulator comprising:
a base member that has a disc-like shape;
a cover member that has a cylindrical shape having an open end and a closed end, the open end being covered by the base member, a circumference of the base member and an outer periphery of the cover member at the open end being joined to each other by full-circled welding, the circumference being in an end of the base member in a radial direction, the cover member and the base member defining a pressure chamber therebetween;
a partition member that is stretchable and partitions the pressure chamber into an inner chamber and an outer chamber; and
labyrinth structures provided in a first part of the base member and a second part of the cover member, the first part of the base member having the labyrinth structure which is located closer to the outer chamber than a welded part between the base member and the cover member, the second part of the cover member having the labyrinth structure which is located closer to the outer chamber than the welded part and being located on an inner periphery of the cover member at the open end, the labyrinth structure of the second part fitting in with the labyrinth structure of the first part to form a first gap that extends in bent form as away from the welded part, wherein
the labyrinth structures include a wall provided in one of the first part and the second part,
the wall projects towards the other of the first part and the second part,
the wall extends in a circumferential direction and has a contacting part and a separating part such that the wall contacts the other of the first part and the second part partially in the circumferential direction,
the contacting part contacts with the other of the first part and the second part, and
the separating part is separated with a second gap from the other of the first part and the second part such that one side of the wall communicates with the other side of the wall in the outer chamber.

2. The accumulator according to claim 1, wherein the labyrinth structures are provided between the welded part and the partition member.

3. The accumulator according to claim 1, wherein a radial thickness of the wall decreases toward the other of the first part and the second part.

4. The accumulator according to claim 1, wherein the labyrinth structures cover the welded part.

5. An accumulator comprising:
a base member that has a disc-like shape;
a cover member that has a cylindrical shape having an open end and a closed end, the open end being covered by the base member, a circumference of the base member and an outer periphery of the cover member at the open end being joined to each other by full-circled welding, the circumference being in an end of the base member in a radial direction, the cover member and the base member defining a pressure chamber therebetween;
a partition member that is stretchable and partitions the pressure chamber into an inner chamber and an outer chamber; and
a labyrinth structure provided in the base member and the cover member, the base member having a first portion of the labyrinth structure which is located closer to the outer chamber than a welded part between the base member and the cover member, the cover member having a second portion of the labyrinth structure which is located closer to the outer chamber than the welded part and being located on an inner periphery of the cover member at the open end, the second portion of the labyrinth structure fitting with the first portion of the labyrinth structure of to form a first gap that extends in a form which bends away from the welded part, wherein
one of the first portion of the labyrinth structure and the second portion of the labyrinth structure includes a wall that projects towards the other of the first portion of the labyrinth structure and the second portion of the labyrinth structure,
the wall extends in a circumferential direction and has a contacting part and a separating part such that the wall contacts the other of the first portion of the labyrinth structure and the second portion of the labyrinth structure partially in the circumferential direction,
the contacting part contacts with the other of the first portion of the labyrinth structure and the second portion of the labyrinth structure, and
the separating part is separated with a second gap from the other of the first portion of the labyrinth structure and the second portion of the labyrinth structure such that one side of the wall communicates with the other side of the wall in the outer chamber.

6. The accumulator according to claim 5, wherein the labyrinth structure is provided between the welded part and the partition member.

7. The accumulator according to claim 5, wherein a radial thickness of the wall decreases toward the other of the first portion of the labyrinth structure and the second portion of the labyrinth structure.

8. The accumulator according to claim 5, wherein the labyrinth structure covers the welded part.

* * * * *